United States Patent
Chung et al.

(10) Patent No.: US 9,513,740 B2
(45) Date of Patent: Dec. 6, 2016

(54) CHIP ARCHITECTURE IN IMPROVE THE SENSING LATENCY TIME IN PROJECTED CAPACITANCE TOUCH

(71) Applicant: Inputek Co. Ltd., Hsinchu County (TW)

(72) Inventors: Chang Kuang Chung, Hsinchu County (TW); Sheng Chang Kuo, Hsinchu County (TW)

(73) Assignee: INPUTEK CO., LTD., Hsinchu County (TW)

( * ) Notice: Subject to any disclaimer, the term of this patent is extended or adjusted under 35 U.S.C. 154(b) by 178 days.

(21) Appl. No.: 14/527,627

(22) Filed: Oct. 29, 2014

(65) Prior Publication Data

US 2016/0124540 A1    May 5, 2016

(51) Int. Cl.
*G06F 3/045* (2006.01)
*G06F 3/041* (2006.01)
*G06F 3/044* (2006.01)

(52) U.S. Cl.
CPC .............. *G06F 3/0416* (2013.01); *G06F 3/044* (2013.01); *G06F 3/041* (2013.01)

(58) Field of Classification Search
CPC .................................................... G06F 3/0416
See application file for complete search history.

(56) References Cited

U.S. PATENT DOCUMENTS

| | | | | |
|---|---|---|---|---|
| 2010/0283760 A1* | 11/2010 | Leung | ..................... | G06F 3/044 345/174 |
| 2011/0001492 A1* | 1/2011 | Nys | ........................ | H03M 1/123 324/658 |
| 2015/0084923 A1* | 3/2015 | Kang | ..................... | G06F 3/044 345/174 |

* cited by examiner

*Primary Examiner* — Jason Olson
(74) *Attorney, Agent, or Firm* — Ming Chow; Sinorica, LLC

(57) ABSTRACT

An IC architecture improving the sensing latency time in Projected Capacitance Touch comprises a sensor, a touch control integrated circuit, a sensing bus, a driving bus, the sensor comprising a plurality of sensing electrodes, and a plurality of driving electrodes. The driving electrodes comprise a selected driving electrode. The sensing electrodes are scanned and the capacitance change in each is recorded while a driving electrode is selected as said selected driving electrode. The touch control integrated circuit comprises a sensing IC, a driving IC, and a micro-programmed control unit (MCU), wherein the sensing IC comprises a module on receiving sensing electrode signal. The module on receiving sensing electrode signal comprises two sets analog latches and two sets analog multiplexers. The two sets analog latches comprising first stage analog latches and second stage analog latches and the two sets analog multiplexers comprising first stage analog multiplexers and second stage analog multiplexers.

13 Claims, 7 Drawing Sheets

CHIP ARCHITECTURE IN IMPROVE THE SENSING LATENCY TIME IN PROJECTED CAPACITANCE TOUCH

FIELD OF THE INVENTION

The present invention relates to a capacitive touch system. More specifically, it is an IC architecture design, which reduces the sensing latency time.

BACKGROUND OF THE INVENTION

The touch screen technology has been widely used recent years in computing devices, such as mobile phones, notebook computers, and variety of portable electronic devices (such as game console, multimedia players, and the like). With this technology used in the user-interface, interaction between user and the computing device become more convenient and efficiency. Instead of using a mouse, keyboard, or any other intermediate devices, users can interact with what is displayed directly. Some touch screen can not only controlled through single or multi-touch gestures but also detect specially coated gloves and stylus.

Among a variety of different touch screen technologies, capacitive touch panels became more popular after the releases of new portable electronic devices. Unlike the surface capacitive touch panels can only detect single touch, the projected capacitive touch (PCT) panels are capable of implementing multi-finger touch detection. The PCT technology makes multi-gesture control possible like enlarge, narrow, rotate, or drag a pattern on a projected capacitive touch panel simultaneously.

Projected capacitive touch screens are made up of a matrix of rows and columns of resistive transparent conductive material such as indium tin oxide (ITO) layered on sheet of glass. The two axes of conductive material are driving electrodes and sensing electrodes. Capacitance exists among them.

As the human body is also an electrical conductor, touching the surface of the display results in a distortion of the screen's electrostatic field. There is a change in the level of capacitance. The chips measures cross capacitive in the X-axis and Y-axis of a projected capacitive touch screen structure and for every intersection of the drive/sense lines the capacity change is interpreted and converted to XY coordinates that correspond to the actual touch position.

Projected touch screen panel contains driving electrodes lay on X-axis direction and sensing electrode lay on Y-axis direction. In the common model of the operation, only one of the driving electrodes will connected to a periodic driving signal, the sensing electrodes can sense the capacitance change of the cross capacitive between driving electrodes and sensing electrodes. By scanning every sensing electrode, the capacitance change in each can be recorded. In order to finish a touch panel scanning, the total time of scanning of sensing electrodes is the number of driving electrodes times the number of sensing electrodes. In the implement of receiving sensing signals, one, or a plurality of ICs are needed to receive signals from sensing electrodes simultaneously for the sake of increasing the frame rate per second also called refresh rate.

The minimum frame rate is 50 frames per second. The higher frame rate the smoother the line drawing. It is easily understood that when drawing a line on screen, the start point is the first frame and the last point is the last frame. Filling more points between the start point and the last point can make the drawing line looking smoother. There is no standard for frame rate per second in specification, but the target frame rate in the current invention is 100 frames per second independent from touch panel size.

In the prior art, parallel processing is using to manipulate the data from sensing electrodes, which means one or several IC process signals from all sensing electrodes as the same time. Suppose there are M sensing electrodes, in this case, M analog circuit modules will needed to manipulate the data from each sensing electrode so that the demand of frame rate per second can be satisfied. This kind of IC architecture design has bigger die size and higher power consumption. It is not suitable for the large size touch application and driving electrodes with high resistance because of the high power consumption and the explosion of cost in order to satisfy the frame rate per second by adding more IC.

In the current invention, analog latches and multiplexers are added in the IC. The analog latches can cut the sensing signals received from sensing electrodes into a few pipes and the multiplexers can multi-tasking the sensing signals. The total sensing signal processing time can be shorten significantly. By multi-tasking the sensing signals, some circuits with typical function can be shared during non-critical pipe. The die area and power consumption can be saved in this case.

DETAILED DESCRIPTION OF THE INVENTION

All illustrations of the drawings and description of embodiments are for the purpose of describing selected versions of the present invention and are not intended to limit the scope of the present invention.

Figure 1:
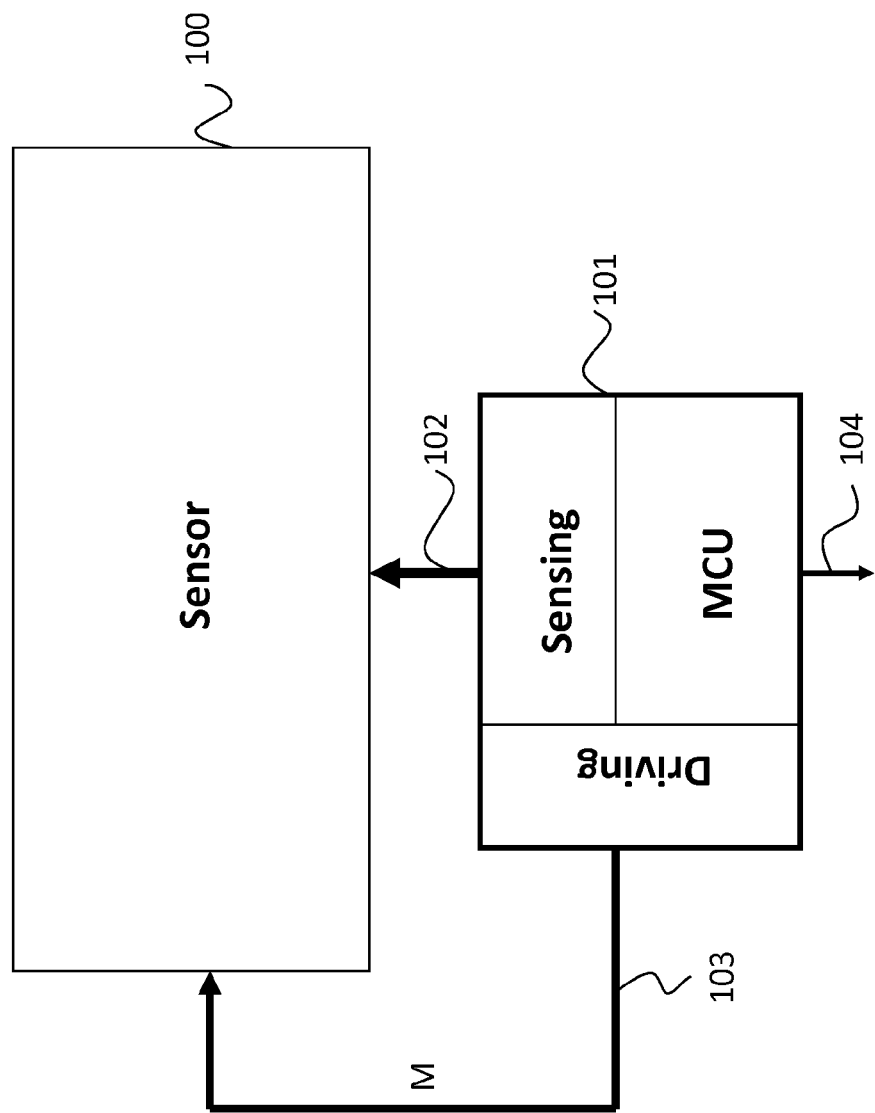
FIG. 1 is a schematic illustration of the architecture of projected capacitive touch system.

The present invention comes up with a novel IC algorithm on projected capacitive touch panel. As shown in FIG. 1, there are three main sections in projected capacitive touch panel touch control IC 101; they are driving, sensing, and MCU. Wherein sensing IC and driving IC are connected to sensor 100 through sensing bus 102 and driving bus 103 respectively. The MCU will execute the firmware program based on touch algorithm to provide driving signal and select driving electrode. The MCU then connect to system through system bus 104 and the touch coordinates will be calculated according to typical algorithm based on the sensing signals scanned from sensing electrodes. In order to achieve the main objective of the present invention, the IC sensing architecture has been improved.

Figure 2:
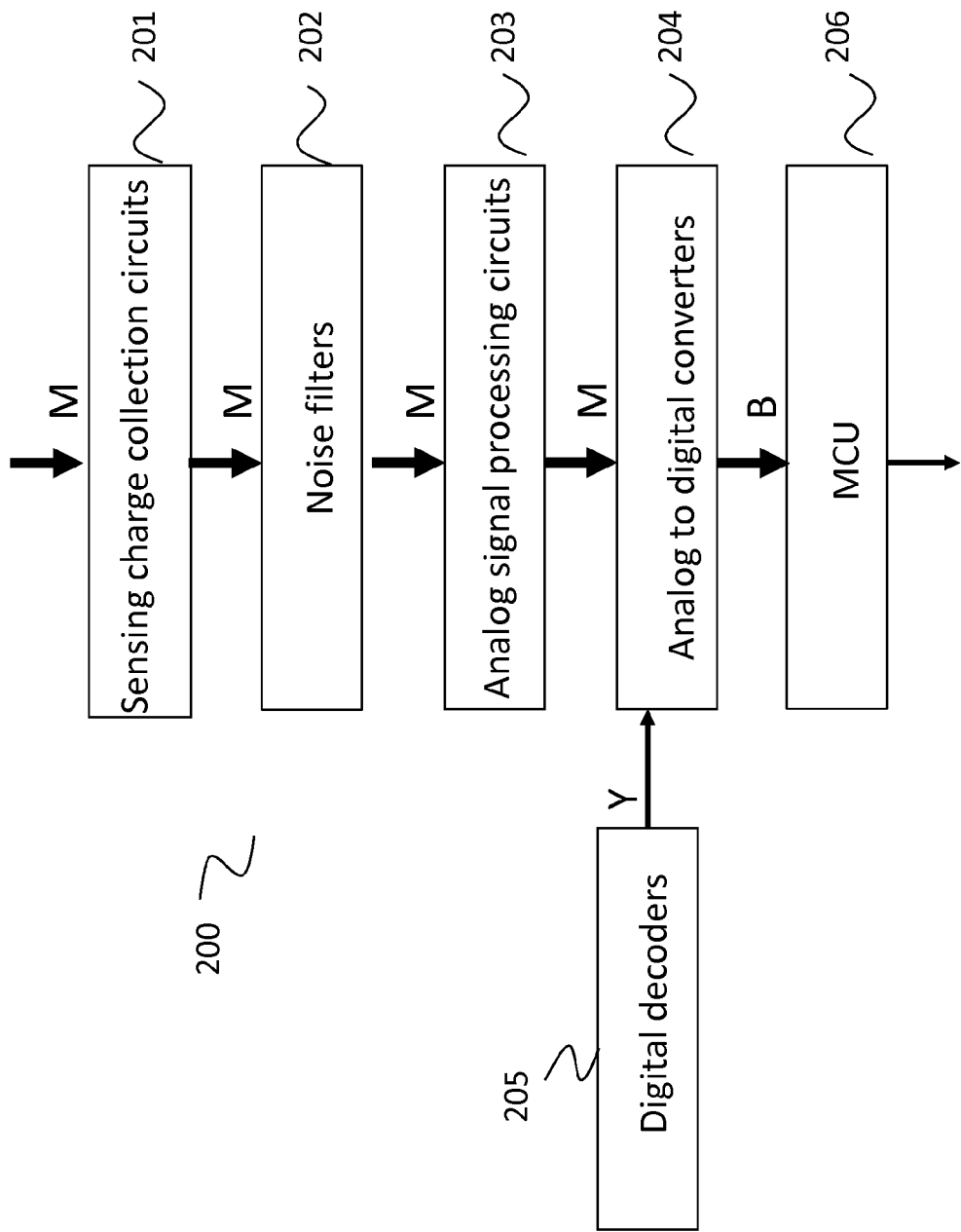
FIG. 2 is a schematic illustration of the module on receiving sensing electrode signals.

In the common module on receiving sensing electrode signal of the projected capacitive touch panel operation as shown in FIG. 2, module on receiving sensing electrode signals 200 contains several sub-modules with typical functions. While a driving electrode is selected to connect to a periodic driving signal, sensing charge collection circuits 201 will detect and collect charge change from every sensing electrode, which is caused by capacitance change between driving electrodes and this sensing electrode. Charge change is a continuous analog signal that sent from the sensing charge collection circuits 201 to noise filters 202, which can filter out noise signal. Analog signal processing circuits 203 then make the filtered analog signal subtracted from the untouched signal and get the signal change rate. The analog signal processing circuits 203 can also process signal amplifying. The processed analog signals are then converted into digital signals by the analog to digital converters (ADC) 204. The digital signals are manipulated by a MCU 206 and touch coordinates are calculated based on typical algorithm. Digital decoders 205 are used to control storing the digital signals into the memory of the MCU 206 set by set and they are connected to the analog to digital converters 204. Y stands for the minimum decoders' output of total analog to digital converters (ADC) data transfer from the sensing charge collection circuits 201 to MCU memory. Y can calculated by formula Y=(R*M)/B. Wherein R is analog to digital converters (ADC) resolution, normally is 10 bits, 12 bits or 16 bits; B is bus width of the MCU 206, normally is 8 bits, 16 bits or 32 bits; and M is the number of the analog to digital converters (ADC). In this case, the number of module on receiving sensing electrode signals is the same as the number of sensing electrodes.

In order to achieve the main objective of the present invention, two key parts of the PCT technology have been improved. One is to add analog latches into the module on receiving sensing electrode signals. By adding a plurality of latches, the module do not need to process sensing data after sampling sensing signals scanning from every driving electrode, which can reduce latency time significantly. Further, the IC architecture can be continuously improved by adding multiplexers after the analog latches. The sensing signals can be processed in multiple task way. According to different time required in every stage of the processing, multi-tasking allows some circuits with typical functions like analog signal processing circuits and analog to digital converters (ADC) being shared during non-critical pipe. The two improvements can significantly saving IC die area and reduce power consumption.

Figure 3:
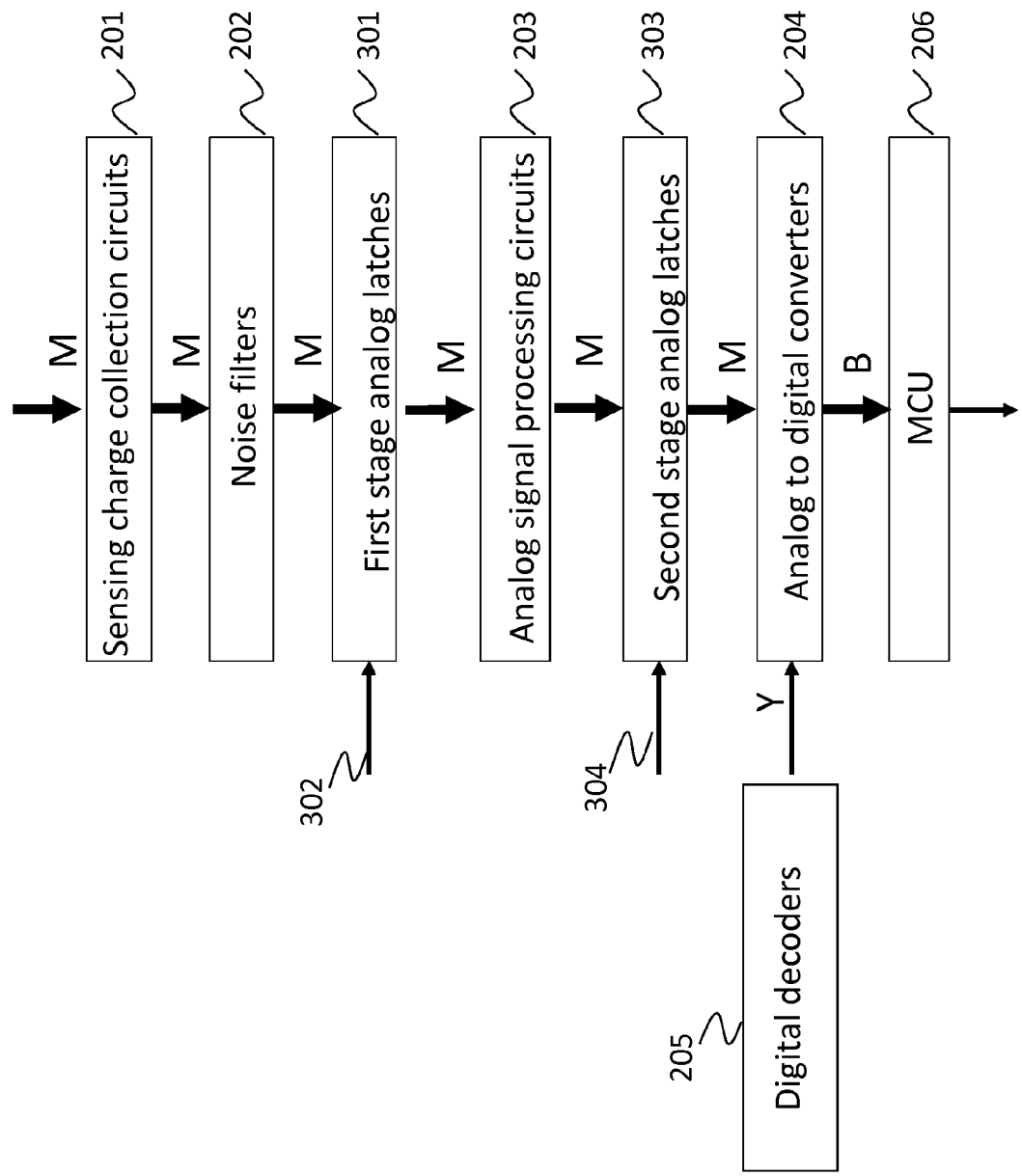
FIG. 3 is a schematic illustration of the module on receiving sensing electrode signals added two analog latches.

As illustrated in FIG. 3, two analog latches are added in the module on receiving sensing electrode signals. First stage analog latches 301 are added between the noise filters 202 and the analog signal processing circuits 203. A digital signal is connected with the first stage analog latches 301 as a control signal 302. This signal controls the sampling and holding status of the first stage analog latches 301. Similarly, second stage analog latches 303 are added between the analog signal processing circuits 203 and the analog to digital converters 204. A control signal 304 is connected with the second stage analog latches 303. The control signal 304 is a digital signal as well and controls the sampling and holding status of the second stage analog latches 303. The function of sampling and holding of the added two analog latches are controlled by two independent digital signals respectively. The waveform of the control signals are single pulse square wave and the low pulse is holding state the high pulse is sampling state. The high pulse width depends on the response time of the analog latches and the pulse is controlled by the MCU 206.

Figure 4:
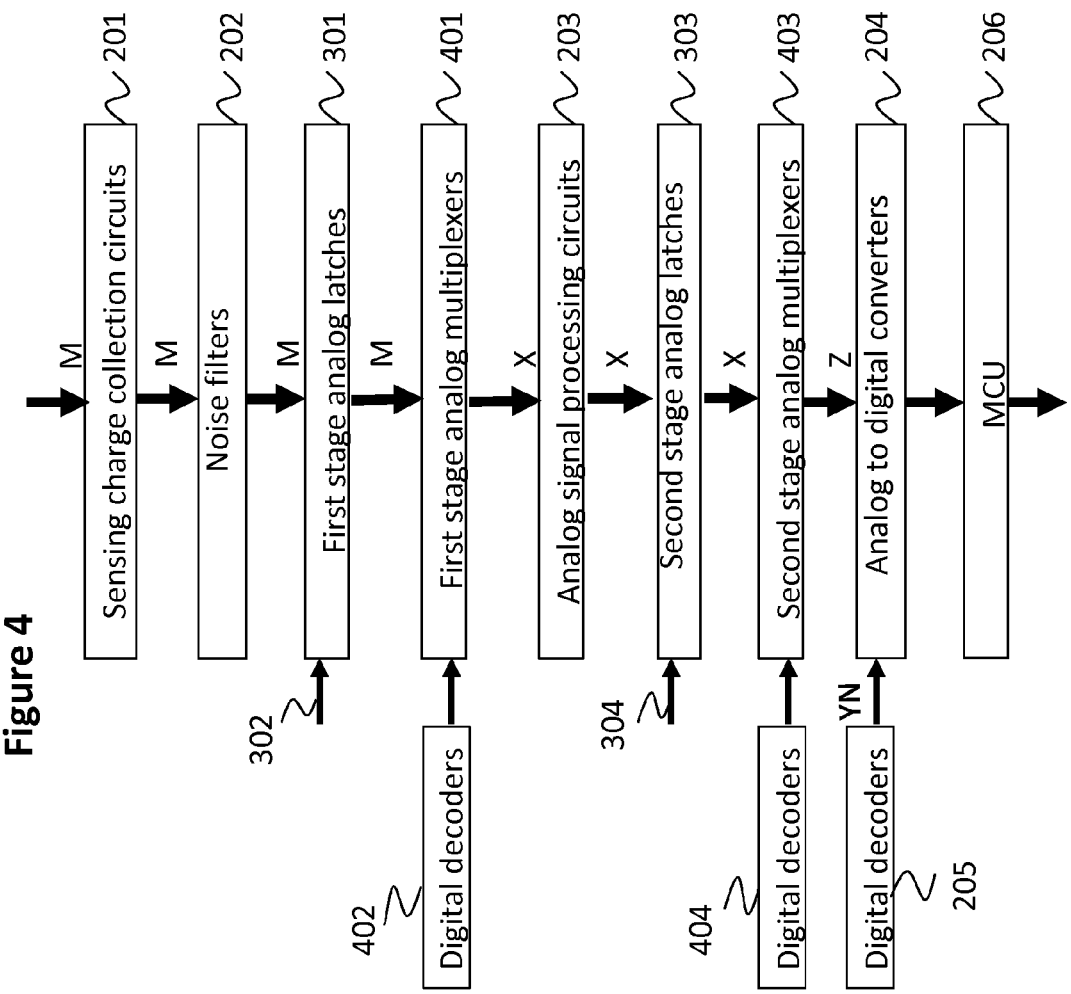
FIG. 4 is a schematic illustration of the module on receiving sensing electrode signals added two analog latches and two multiplexers.

In the module on receiving sensing electrode signals, signals processing on the sensing charge collection circuits 201 and the noise filters 202 require the longest time. Analog signals are continuous signals. In most design, sensing charge and noise filtering circuits are bounded. Analog filters are used for filtering out unwanted frequency noise, (most of the analog filters are low pass filter or band pass filter), and the signals in output node of analog latches is DC voltage. In this case, noise filters will be useless. In the present invention, the process from input of the sensing charge collection circuits 201 to output of the noise filters 202 will be critical path. The latency time during this process can be used to manipulate data in other processes. In order to share some circuits with typical functions during the latency time of critical path, analog multiplexers and digital decoders are added in the module on receiving sensing electrode signals as illustrated in FIG. 4.

Multiplexers are mainly used to increase the amount of data that can be sent over the network within a certain amount of time and bandwidth. Multiplexer requires parallel input and serial output. An electronic multiplexer makes it possible for several signals to share one device or resource, for example using one analog to digital converter or one communication line, instead of having one device per input signal. As shown in FIG. 4, input end of first stage analog multiplexers 401 are connected to the output end of the first stage analog latches 301 and output end of the first stage analog multiplexers 401 are connected to the input end of the analog signal processing circuits 203. Digital decoders 402 are connected to the first stage analog multiplexers 401. Input end of second stage analog multiplexers 403 are connected to the output end of the second stage analog latches 303 and output end of the second stage analog multiplexers 403 are connected to the input end of the analog to the digital converters 204. Digital decoders 404 are connected to the second stage analog multiplexers 403. In the current invention, suppose the number of driving electrodes is N and the number of sensing electrodes is M. In design stage, number of first analog latches data can be operated X is fixed. The first stage analog multiplexers 401 totally need A=M/X times to handle the M lines of first analog latches data. A is the number of output of the digital decoders 402. A digital decoder of n inputs has $2^n$ outputs, so input of the digital decoders 402 is $\log_2 A$. There are X second analog latches 303 needed. Number of the analog to digital converters (ADC) 204 Z that can parallel process second stage latches data is fixed. The second stage analog multiplexers totally need B=X/Z times to handle the X lines of second analog latches data. B is the number of output of the digital decoders 404. Input of the digital decoders 404 is $\log_2 C$. In this case, only X analog signal processing circuits and Z analog to digital converters are needed instead of M of them. Latches change form set state to hold state after they get M sensing signals from selected driving electrodes. N driving electrodes need N times latches change. By connecting with the digital decoders, all M lines input can be decoded.

Figure 5:
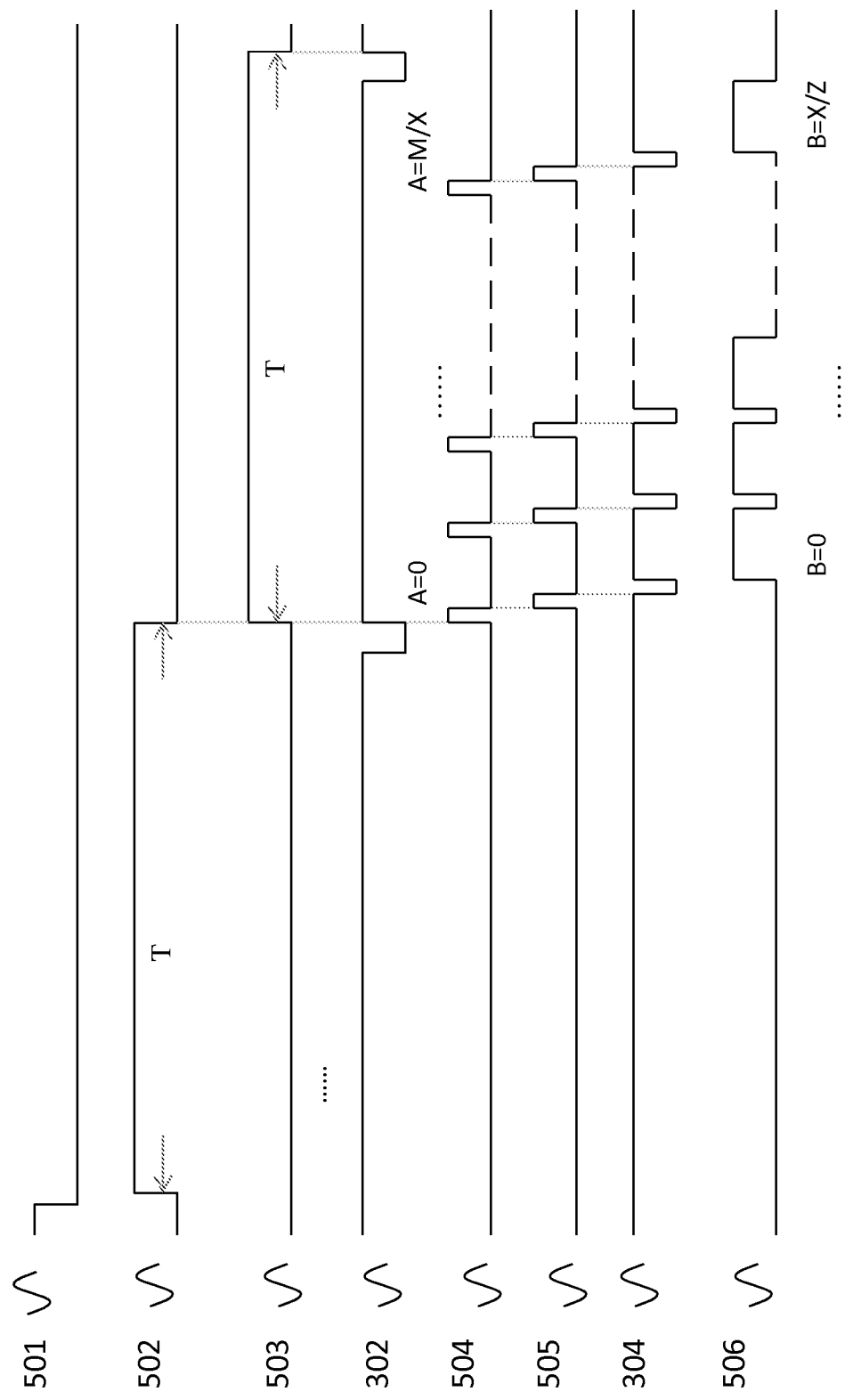
FIG. 5 is a schematic illustration of the timing diagram of some key elements in the module on receiving sensing electrode signals during the first two critical path periods.

FIG. 5 illustrates timing diagram of some key elements in the module on receiving sensing electrode signals. As an example, only the first two critical path periods are shown in FIG. 5. The first two critical path periods are the time T of the first driving electrode being selected and the time T of the second driving electrode being selected. After a low pulse 501 enables the chip, the module begins to work.

During the first critical path period, pulse 502 changed into high level, the first driving electrode is selected, and the module on receiving sensing electrode signals 200 corresponding to M sensing electrodes begins to receive sensing signals sensed from the first selected driving electrode. The first stage analog latches are sampling until the control signal 302 sending a low-level pulse that changing it into hold state. Sensing signals sensed from the first selected driving electrode are holding on the first stage analog latches 301 before the control signal 302 change back to high level. During the second critical path period, pulse 503 changed into high level, the second driving electrode is selected, and module on receiving sensing electrode signals corresponding to M sensing electrodes begins to receive sensing signals sensed from the second driving electrode. According to the first stage analog multiplexer's latency time 504, the first stage analog multiplexers 401 output X lines of signal to the analog signal processing circuits 203. Analog signal processing circuits' latency time 505 reflects signal-processing time of the signals output from the first stage analog multiplexers 401. The second stage analog latches 303 hold the X lines of data after the second critical path period controlled by the control signal 304. Then the second stage analog multiplexers 403 output Z lines of signal to the analog to the digital converters 204. The analog to digital converter latency time 506 shows the latency time before signal outputted into the MCU 206. Keep changing the selected driving electrode until the last one. For each selected driving electrode, repeat the same steps as that in the second critical period. When the last driving electrode is selected, the signals sensed from the second last one are processing in the module on receiving sensing electrode signals 200. When restart from the first driving electrode, the signals sensed from the last one are processing in the module on receiving sensing electrode signals 200.

Figure 6:
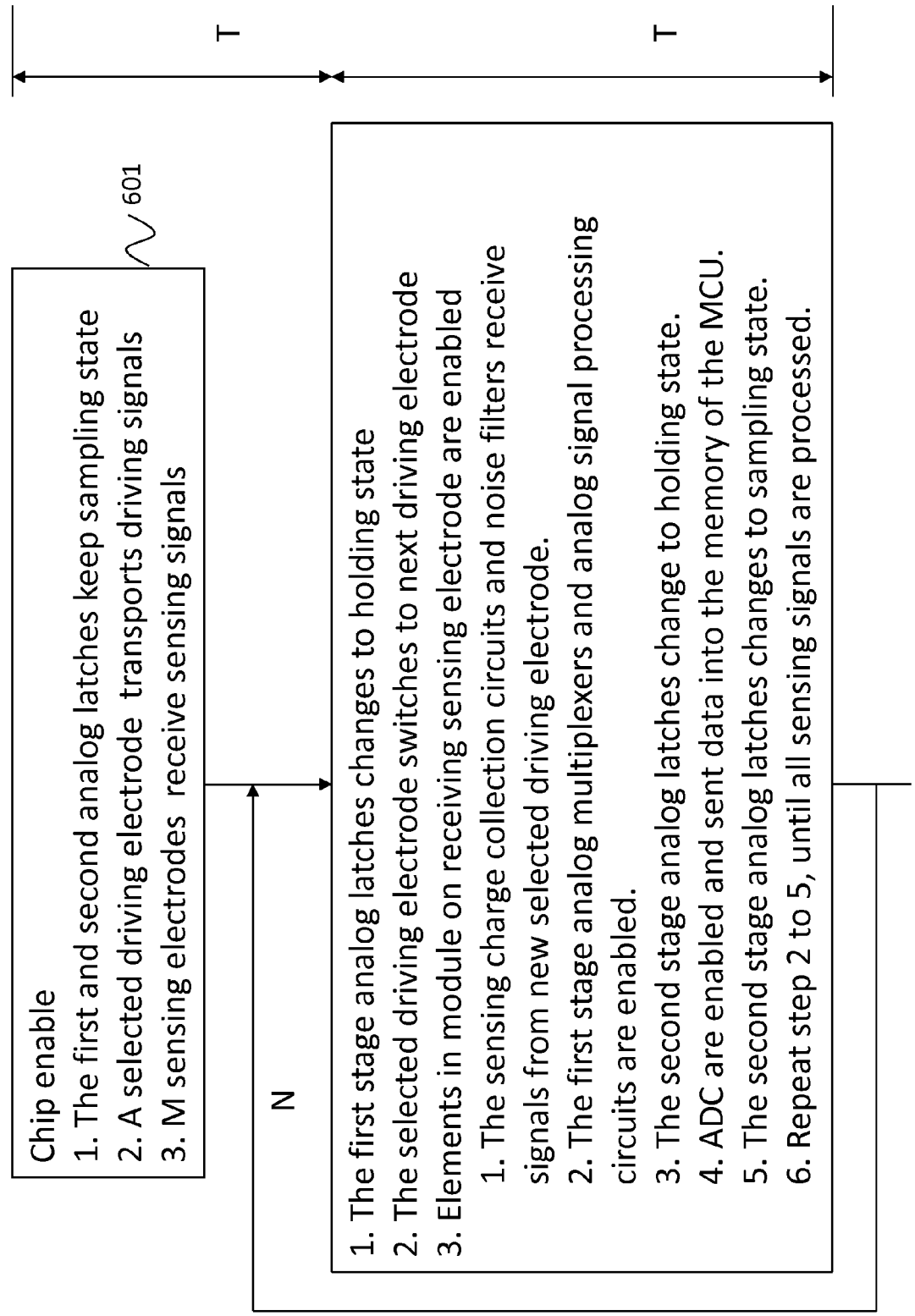
FIG. 6 is a schematic illustration of the operation process of the current module on receiving sensing electrode signals.
Figure 7:
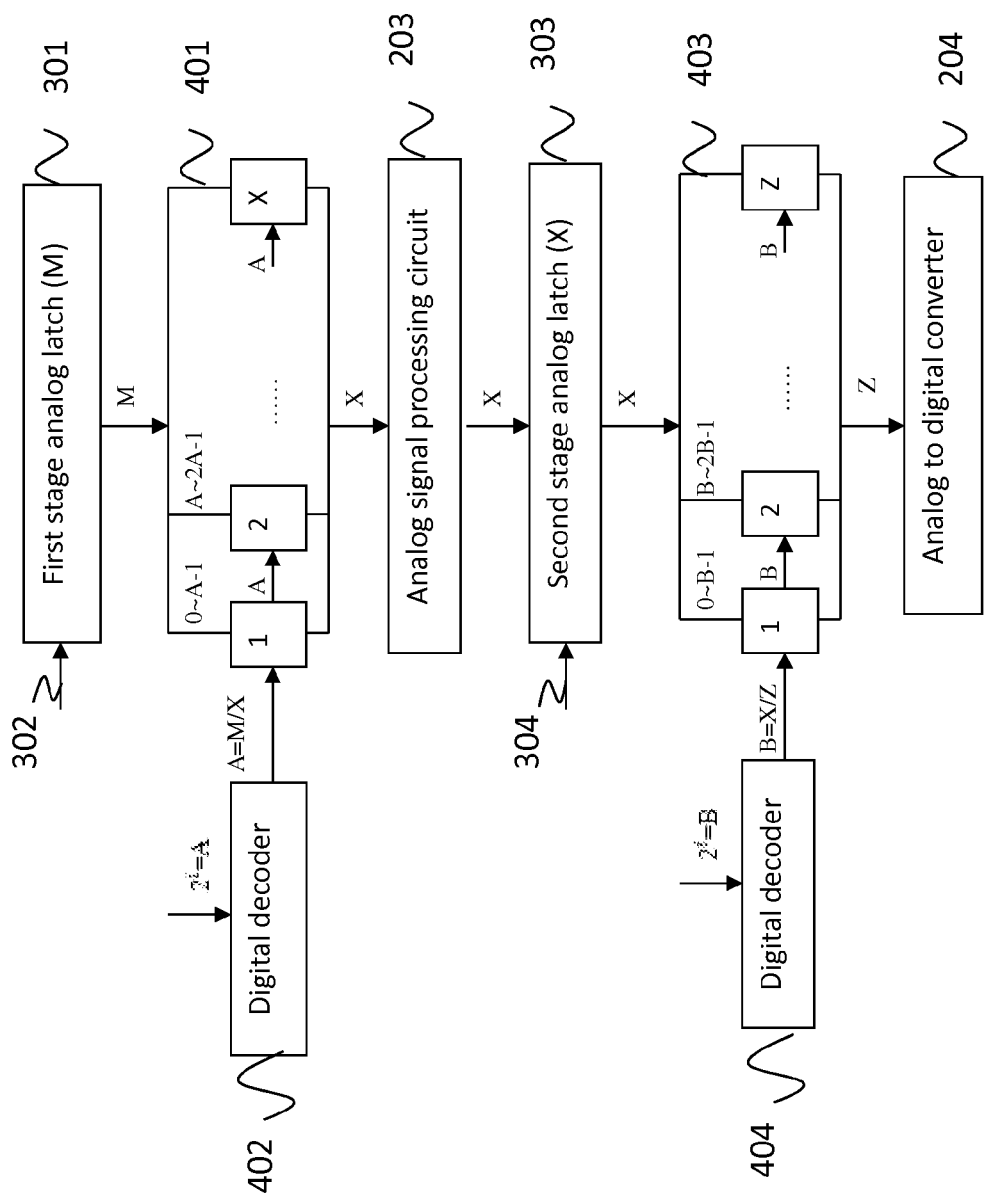
FIG. 7 is a schematic illustration of the detailed operation of multiplexers in the module on receiving sensing electrode signals.

The operation process is illustrated in FIG. 6, wherein consider the structure in FIG. 4. When chip enable, a selected driving electrode will driving an AC signal, meanwhile the M modules on receiving sensing electrode signals corresponding to the M sensing electrodes will begin receiving signals. The first and second stage analog latches 301 and 303 are keeping sampling state. The sensing charge collection circuits 201 and the noise filters 202 are bounded in the current invention. Signals send from the sensing charge collection circuits 201 input ends to the noise filters 202 output ends will be critical path and latency time of the first driving electrode selected processes 601 will be T. After the latency time is longer than the latency time T of the critical path, the first stage analog latches 301 changed to holding state. The selected driving electrode switches to next driving electrode. All other elements in module on receiving sensing electrode are enabled. More specifically, the sensing charge collection circuits 201 and the noise filters 202 receive signals from new selected driving electrode. The first stage analog multiplexers 401 and the analog signal processing circuits 203 are enabled. The second stage analog latches 303 changed to holding state. The analog to digital converters (ADC) 204 are enabled and send data into the memory of the MCU 206. The second stage analog latches 303 changed to sampling state.

During second period T, the first stage analog multiplexers 401 output X lines of signals to the analog signal processing circuits 203. Detail of operation of multiplexers is illustrated in FIG. 6. M first stage analog latches are needed to store M sensing electrode voltage in the prior art, by using analog multiplexers, only X analog signal processing circuits 203 need to be built, and after A=M/X times operation, all M lines of signals from the first analog latches 301 can be executed by the analog signal processing circuits 203. After the second period T, the second stage analog latches 303 control signal will hold X lines of data. The analog to digital converters (ADC) 204 will convert the analog signals output of the second stage analog latches 303 to digital signals. After the second stage multiplexers 403, only Z analog to digital converters 204 need to be built, and after B=X/Z times operation, all X lines of analog signals from the second stage analog latches 303 can be converted to digital signals by the analog to digital converters (ADC) 204.

By adding the two analog latches and the two multiplexers, number of analog signal processing circuits and analog to digital converters (ADC) used in the IC is reduced and as mentioned above, the current invention can achieve a high frame rate per second with fewer die area and power consumption and particularly suitable for the large size touch applications. While using driving electrodes with high resistance, it needs a longer signal transmission time leading to a low frame rate per second. The current invention can also get rid of this problem. Besides, when the M and N tracks increase, the pixel number of a projected capacitance touch panel dramatically increases and thereby the frame rate of the touch panel degrades significantly due to the long time period for scanning the large scale touch panel in a frame. The capacitive touch system can maintain a good frame rate; even the touch panel is a large scale touch panel.

Although the invention has been explained in relation to its preferred embodiment, it is to be understood that many other possible modifications and variations can be made without departing from the spirit and scope of the invention as herein described.

What is claimed is:

1. A project capacitive touch panel architecture, comprising:
    a sensor;
    a touch control integrated circuit;
    a sensing bus;
    a driving bus;
    said sensor comprising a plurality of sensing electrodes, and a plurality of driving electrodes;
    said driving electrodes comprise a selected driving electrode,
    wherein said sensing electrodes are scanned and the capacitance change in each is recorded while a driving electrode is selected as said selected driving electrode;
    said touch control integrated circuit comprises a sensing IC, a driving IC, and a micro-programmed control unit (MCU),
    wherein said sensing IC comprises a module on receiving sensing electrode signal;
    said module on receiving sensing electrode signal comprises two sets analog latches and two sets analog multiplexers;
    said two sets analog latches comprising first stage analog latches and second stage analog latches; and
    said two sets analog multiplexers comprising first stage analog multiplexers and second stage analog multiplexers.

2. The projected capacitive touch panel architecture of claim 1, wherein said sensor comprising:
    a plurality of sensing electrodes;
    a plurality of driving electrodes;
    a quantity of said sensing electrodes being M;
    a quantity of said driving electrodes being N; and
    each said sensing electrode being scanned N times.

3. The projected capacitive touch panel architecture of claim 1, wherein said module on receiving sensing electrode signal comprising:
- a plurality of sensing charge collection circuits, a plurality of noise filters, said first stage analog latches, said first stage analog multiplexers, a plurality of analog signal processing circuits, said second stage analog latches, said second stage analog multiplexers, a plurality of analog to digital converters (ADC), a micro-programmed control unit (MCU), and a plurality of digital decoders;
- said a plurality of digital decoders connect to said first stage analog multiplexers, said second stage analog multiplexers and said analog digital converters (ADC) respectively; and
- said first stage analog latches and said second stage analog latches being controlled by control signals respectively;
- said control signals being single pulse square wave and low pulse being holding state and high pulse being sampling state; and
- said high pulse width depends on response time of said analog latches and the pulse controlled by said micro-programmed control unit (MCU).

4. The projected capacitive touch panel architecture of claim 3, wherein said module on receiving sensing electrode signal comprising:
- a quantity of said analog signal processing circuits being X; and
- a quantity of said analog to digital converters being Z.

5. The projected capacitive touch panel architecture of claim 2, comprising:
- said selected driving electrode being selected by said micro-programmed control unit (MCU) from the first driving electrode of said plurality of driving electrodes to the last driving electrode of N of said driving electrodes.

6. The projected capacitive touch panel architecture of claim 3, comprising:
- said sensing charge collection circuits collecting charge changes information by scanning each said sensing electrode regarding to capacitance change;
- said analog sensing signals being output from said sensing charge collection circuits to said noise filters;
- said first stage analog latches receive M lines of said analog sensing signals output from said noise filters;
- said first stage analog latches output said M lines of said analog sensing signals to said first stage analog multiplexers;
- said digital decoders connected to said first stage multiplexers outputs M/X lines of data to said first stage multiplexers;
- said first stage analog multiplexers output X lines of analog signals to said analog signal processing circuits;
- said second stage analog latches receive X lines of processed analog signal from said analog signal processing circuits and output to said second stage analog multiplexers;
- said second stage analog latches being sampling state when controlled by a high level control signal and said second stage analog latches being holding state when controlled by a low level control signal;
- said digital decoders connected to said second stage multiplexers outputs X/Z lines of data to said first stage multiplexers;
- said second stage multiplexers output Z lines of analog signal to said analog to digital converters;
- said Z lines of analog signal converted into digital signal by said analog to digital converters; and
- said digital signals being sent into memory of said MCU set by set controlled by said digital decoders connected to said analog to digital converters.

7. The projected capacitive touch panel architecture of claim 6, comprising:
- said charge changes information being M lines of analog sensing signals;
- said noise filters filtering noise signal among collected said analog sensing signal;
- said first stage analog latches being sampling state when controlled by a high level control signal and said first stage analog latches being holding state when controlled by a low level control signal;
- said first stage analog latches hold said analog sensing signal until next selected said driving electrode data is ready;
- said analog signal processing circuits make the filtered analog signal subtracted from the untouched signal to get the signal change rate and processes signal amplify;
- said second stage analog latches being sampling state when controlled by a high level control signal and said second stage analog latches being holding state when controlled by a low level control signal;
- said analog to digital converters convert analog signals into digital signals; and
- said digital signals being output to store in said micro-programmed unit (MCU).

8. A module on receiving sensing electrode signal, comprising:
- a plurality of sensing charge collection circuits wherein M lines of signals input to said sensing charge collection circuits;
- a plurality of noise filters wherein number of said noise filters being M;
- a plurality of first stage analog latches;
- a control signal controls state of said first stage analog latches;
- a plurality first stage analog multiplexers;
- a plurality of analog signal processing circuits;
- a plurality of second stage analog latches;
- a control signal controls state of said second stage analog latches;
- a plurality of second stage analog multiplexers;
- a plurality of analog to digital converters;
- a micro-programmed control unit (MCU);
- a plurality of digital decoders; and
- said digital decoders connected to said first stage multiplexers and connected to said second stage multiplexers.

9. The module on receiving sensing electrode signal of claim 8, comprising:
- said quantity of analog signal processing circuits being X;
- said quantity of analog to digital converters being Z;
- said analog signal processing circuits output X lines of signals;
- said digital decoders connected to said first stage multiplexers outputs M/X lines of data to said first stage multiplexers; and
- said digital decoders connected to said second stage multiplexers outputs X/Z lines of data to said first stage multiplexers.

10. The module on receiving sensing electrode signal of claim 9, comprising:
- said sensing charge collection circuits output signals to said noise filters;

said noise filters output signals to said first stage analog latches;

said first stage analog latches output signals to said first stage analog multiplexers and said digital decoders connected to said first stage multiplexers;

said first stage analog multiplexers output signals to said analog signal processing circuits;

said analog signal processing circuits output signals to said second stage analog multiplexers and said digital decoders connected to said second stage multiplexers;

said second stage analog multiplexers output signals to said analog to digital converters; and said analog to digital converters output signals to said micro-programmed unit (MCU).

11. The module on receiving sensing electrode signal of claim 9, comprising:

said first stage multiplexers process said M lines of signal M/X times; and said second stage analog multiplexers process said X lines of signal X/Z times.

12. The module on receiving sensing electrode signal of claim 8, comprising:

said sensing charge collection circuits collecting charge changes information by input of said M lines of signals;

said noise filters filtering noise signal among collected said analog sensing signal;

said first stage analog latches receive M lines of said analog sensing signals output from said noise filters;

said first stage analog latches hold said analog sensing signal until next selected said driving electrode data is ready;

said analog signal processing circuits make the filtered analog signal subtracted from the untouched signal to get the signal change rate and processes signal amplify;

said second stage analog latches receive X lines of processed analog signal from said analog signal processing circuits and output to said second stage analog multiplexers;

said Z lines of analog signal converted into digital signal by said analog to digital converters; and said digital signals sent to MCU for further implement.

13. The module on receiving sensing electrode signal of claim 12, comprising:

said charge changes information being M lines of analog sensing signals;

said first stage analog latches being sampling state when controlled by high level of said control signal and said first stage analog latches being holding state when controlled by low level of said control signal; and said second stage analog latches being sampling state when controlled by high level of said control signal and said second stage analog latches being holding state when controlled by low level of said control signal.

* * * * *